United States Patent

[11] 3,582,879

[72] Inventor Herbert Sullivan
Fort Lee, N.J.
[21] Appl. No. 819,362
[22] Filed Apr. 25, 1969
[45] Patented June 1, 1971
[73] Assignee Computer Modern Corporation
Fort Lee, N.J.

[54] COMMUNICATION CHANNEL EQUALIZATION SYSTEM AND EQUALIZER
4 Claims, 2 Drawing Figs.

[52] U.S. Cl. .......... 340/146.1, 235/323, 178/69(A), 178/69(H), 178/69(L), 178/69(M)
[51] Int. Cl. .......... H04b 1/66, G01r 29/00
[50] Field of Search .......... 340/146.1; 325/323; 178/69

[56] References Cited
UNITED STATES PATENTS
3,457,562 7/1969 Fano .......... 340/146.1X
3,492,642 1/1970 Kretzmen .......... 340/146.1
OTHER REFERENCES
Cooley, James W. et al. Application of the Fast Fourier Transform to Computation of Fourier Integrals, Fourier Series, and Convolution Integrals . In IEEE Trans. on Audio and Electroaucoustics. AU-15(0): p. 79— 84. June 1967.

*Primary Examiner*—Malcolm A. Morrison
*Assistant Examiner*—R. Stephen Dildine
*Attorney*—Watson, Leavenworth and Kelton

ABSTRACT: Compensating distortion of received signals is accomplished in the system. A duplicate of the transmitter error correction code encoder is used to reconstruct the transmitted signals which are then compared with the received signals to generate the equalization control signals. The fourier transformer of the received signals is divided by the fourier transform of the equalization control signals to generate the fourier transform of the equalized signals which is then inverse transformed.

COMMUNICATION CHANNEL EQUALIZATION SYSTEM AND EQUALIZER

This invention pertains to equalization of wire communication systems and more particularly to a system for equalizing digital data transmission systems wherein the transmitted data is error correction encoded.

A primary consideration in the high speed transmission of digital data signals from a data transmitting station to a data receiving station over wire communication channels is the linear distortion observable in received signals. This distortion, attributable in large part to departures of the phase and amplitude frequency responses of the communication channel from ideal responses, is compensated for at the receiving station by what is generally designated an equalizing system, i.e. a system which introduces a controlled compensating distortion into signals received from the channel such that thus equalized signals more closely approach signals applied to the channel at the transmitting station.

In addition to requiring the use of such equalization systems this channel distortion results in the need for retransmitting unintelligible received data signals, where the distortion is excessive or inadequately compensated for by the equalizing system. Since data transmission efficiency is measured as the number of data bits per unit time, transmission efficiency is decreased extensively where such repetitive transmissions are required. This decreased efficiency attributable to compensation inadequacies of presently available channel equalization systems underlies a substantial need in the data communication industry for improved equalization systems. With equalization improvements, the number of repetitive transmissions can be reduced concomitantly with resulting higher transmission efficiency.

In present equalization systems received signals compensatingly distorted by the equalizing apparatus or equalizer are constantly compared with a desired standard to generate weighted error signals to which the equalizer responds in further modifying the characteristics of received signals. The system equalizer has normally taken the form of a circuit element known as the transversal filter. Various arrangements both analog and digital, have been proposed for generation of the desired standard by which the weighted error signals or equalizer control signals are provided.

It is an object of the present invention to provide an equalization system providing improved equalization of communication channels.

It is a further object of the present invention to provide a novel equalizer for improved equalization of communication channel equalization systems.

The present invention involves an equalization system providing for the generation of an equalizer control signal which is a derivative of the transmitted signals as affected by the communication channel. While such equalization system may include the transversal filter or like conventional circuit as its equalizer, the system is preferably operated in conjunction with a novel equalizer of increased accuracy.

In accordance with the present invention an equalization system is provided wherein use is made of the error correction code of the data transmission system to provide a standard for enabling compensation of distortion in received signals.

Briefly stated, the equalization system of the invention is operative to compare uncorrected preliminarily equalized received signals with signals reconstituted therefrom and representative of corresponding transmitted signals, to thereby generate equalization control signals. By preliminarily equalized received signals are meant received signals acted upon and equalized in accordance with then existing equalization control signals. The equalization system processes such uncorrected preliminarily equalized received signals in accordance with the known error correction code thereof to provide corrected data signals. The system then generates said signals representative of corresponding transmitted signals by applying the known error correction code to the corrected data signals. Comparison of these two signals, received and receiver-generated versions of the transmitted signals, provides an equalization control signal closely indicative of channel-induced distortion and applicable to any equalizer for equalization of the channel.

In further efficient attainment of the objectives of the invention, there is provided in accordance with the invention a novel equalizer employable in the subject equalization system. This equalizer provides for conversion of the uncorrected received signals from their time domain to the frequency domain prior to equalization thereof. It provides further for like conversion of the equalization control signal and filtering thereof. Equalization is then performed by circuitry receiving the signals and modifying the characteristics of the former signals in accordance with the latter signals. Thus equalized signals are then converted from the frequency domain back to the time domain.

The foregoing and other objects and features of the invention will be evident from the following detailed description of preferred embodiments of an equalizing system and of an equalizer constructed in accordance with the invention and illustrated in the accompanying drawings.

Since the present invention is based in part in its operation upon a particular type of transmitted signal, namely error correction encoded data signals, it will be advantageous initially to discuss the characteristics thereof. It is customary in digital data transmission systems to include at the data transmitting station an encoder operating upon data provided by a data source to insert into the blocks of transmitted data an error correction code. For example, $x$ error control bits may be calculated by the encoder to indicate independently the correct contents of $y$ data bits generated by the data source by an error correction code in which each of the error control bits is assigned to a particular combination of data bits, e.g. even pairs, alternate odd pairs, etc. Of course the ratio of $y$ to $x$ is selected to provide maximum transmission by volume of utilizable information (data bits) and yet provide adequate error detection and correctability for the information. The composite $x$ and $y$ message is transmitted on the communication channel and is applied to error control detection apparatus in the receiver. In this receiver apparatus wherein the system error correction code is known (stored), the detected data is analyzed for its correctness, required corrections being made to data signals erroneously transmitted by the channel. The corrected data signals are then supplied to a data utilization device. Since the system error correction code involves a compromise between the relative number of $y$ bits to $x$ bits, occasions arise where the receiver apparatus is unable to correct the received signals, i.e. where the received signals contain errors in excess of the correction capacity of the chosen error correction code. In such case, the receiver generates a repeat transmission request and the data transmitter complies by repeating the transmission.

Figure 1:
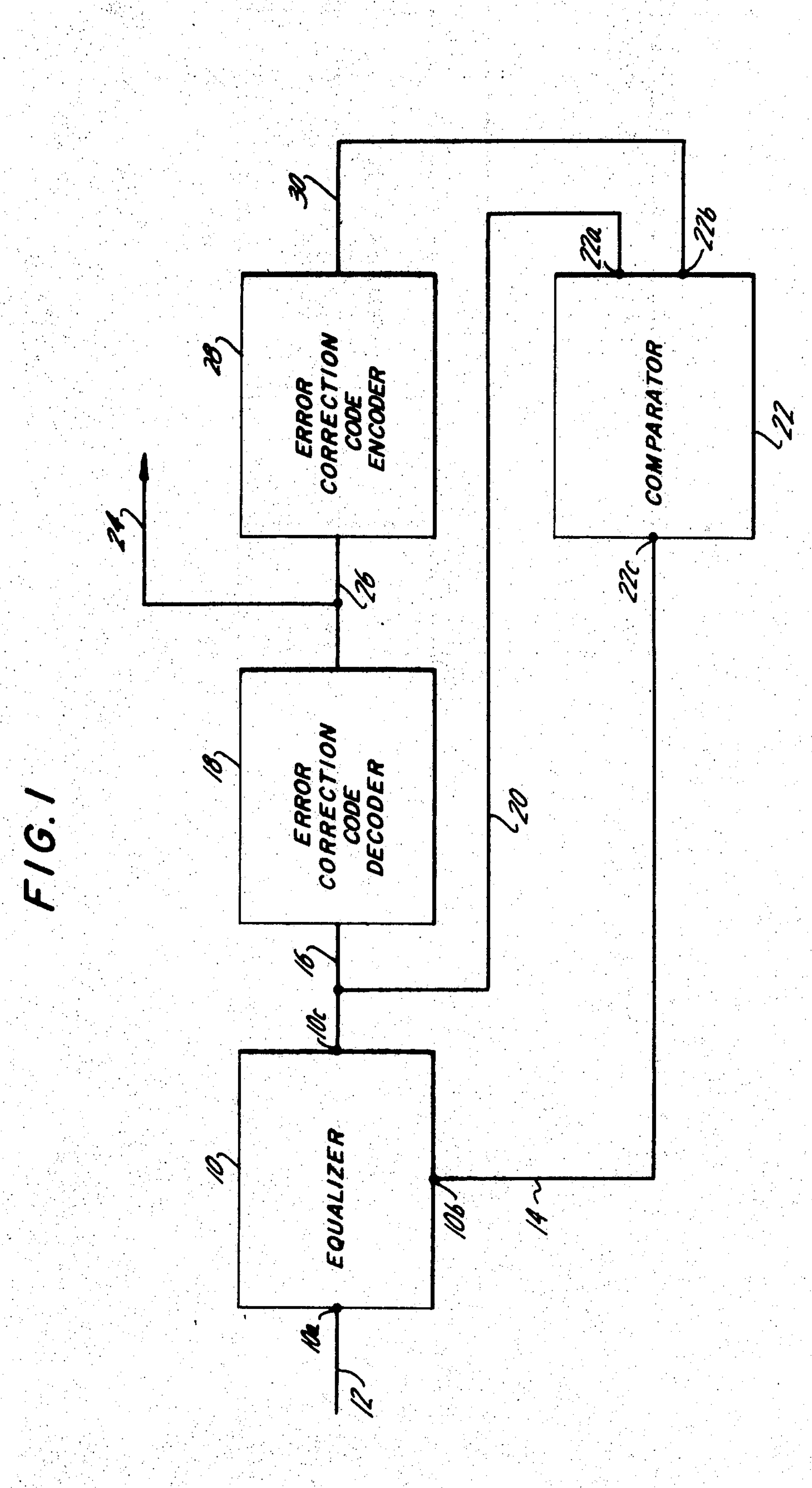
FIG. 1 is a block diagram of the equalization system of the invention.

Referring to FIG. 1 wherein the equalization system of the invention is shown by way of its block diagram, the transmitted error correction encoded digital signals as received from a communication channel and appropriately demodulated are applied to communication channel equalizer 10 over line 12 through equalizer input terminal **10*a*. In performing its function of introducing controlled distortion into these applied signals and thereby compensating same for channel-induced distortion, equalizer 10 is provided with an equalization control signal applied to terminal 10*b* thereof over line 14. The equalizer output signals are generated at output terminal 10*c*. These preliminarily equalizer digital signals, i.e. signals equalized by previously existing equalization control signals, are applied over line 16 to error correction code decoder 18 and also over line 20 to the input terminal 22*a* of comparator 22. Error correction code decoder 18, which has stored therein the error correction code employed in encoding data signals at the transmitter, processes these applied digital signals in conjunction with the error correction code to extract the $y$ code bits and to generate at its output terminal signals indicative of data contained in the applied signals in its correct form. Thus, for example, if the decoder notes errors in the decoded data, it modifies such data to transform same to that originally transmitted by the transmitter. These corrected data signals are made available over line 24 for use in an associated data utilization device. They are also conducted over line 26 to an error correction code encoder 28. This device is a direct counterpart of like apparatus in the transmitter and again has stored therein the system error correction code. By use of such code, encoder 28 generates at its output terminal signals representative of the composite error control encoded digital signals ($x$ and $y$ bits) generated at the transmitter and applied through suitable modulating means to the communication channel input terminals. These signals are applied over line 30 to the input terminal 22*b* of comparator 22. It will be recalled that the preliminarily equalized digital signals are applied to comparator input terminal 22*a*. There are thus provided to the comparator two versions of the system information, a first, at terminal 22*a*, representing the system information as directly affected by the communication channel characteristics, and a second at terminal 22*b*, representative of the information actually applied to the communication channel. The comparator includes difference or other appropriate comparing circuitry and thereby provides output signals indicative of the nature of the correction which is required for equalization of the channel. These signals, made available to equalizer 10 over line 14 are the above-discussed equalization control signals. Equalizer 10 operates in response to these signals to modify its compensating distortion of the demodulated signals provided by the communication channel to input terminal 10*a*** thereof.

It will be apparent that the equalization process is dynamic in character in that constantly updated equalization control signals are generated on line 14. The term "preliminarily equalized" used above in describing the single cycle above is thus somewhat illusory. In the absence of the occurrence of a major fault in the communication channel, the equalization control signal will undergo only minor excursions in value over a relatively long period of time in the operation of the system. On the other hand, in the initial energization of the system or where there has been a change to another telephone line, there will occur a constant change in equalization control signals until an equilibrium condition of maximum equalization is achieved.

The equalization control signal provided by the equalization system of FIG. 1 may be employed in conjunction with any suitable equalizer. For example, the conventionally employed transversal filter requires for its operation a signal advisory of changes to be made in the compensating distortion of received signals. While the equalization control signal provided by the present system is not generated in the same manner as in systems normally employed in conjunction with the transversal filter, nor by like apparatus, the signal of the system of the invention is nevertheless indicative of the required information and is in fact significantly more qualitative. On the other hand, this equalization control signal lends itself readily to use in conjunction with other forms of equalizer. A particularly advantageous equalizer employable in the equalization system of FIG. 1 is illustrated in FIG. 2.

Figure 2:
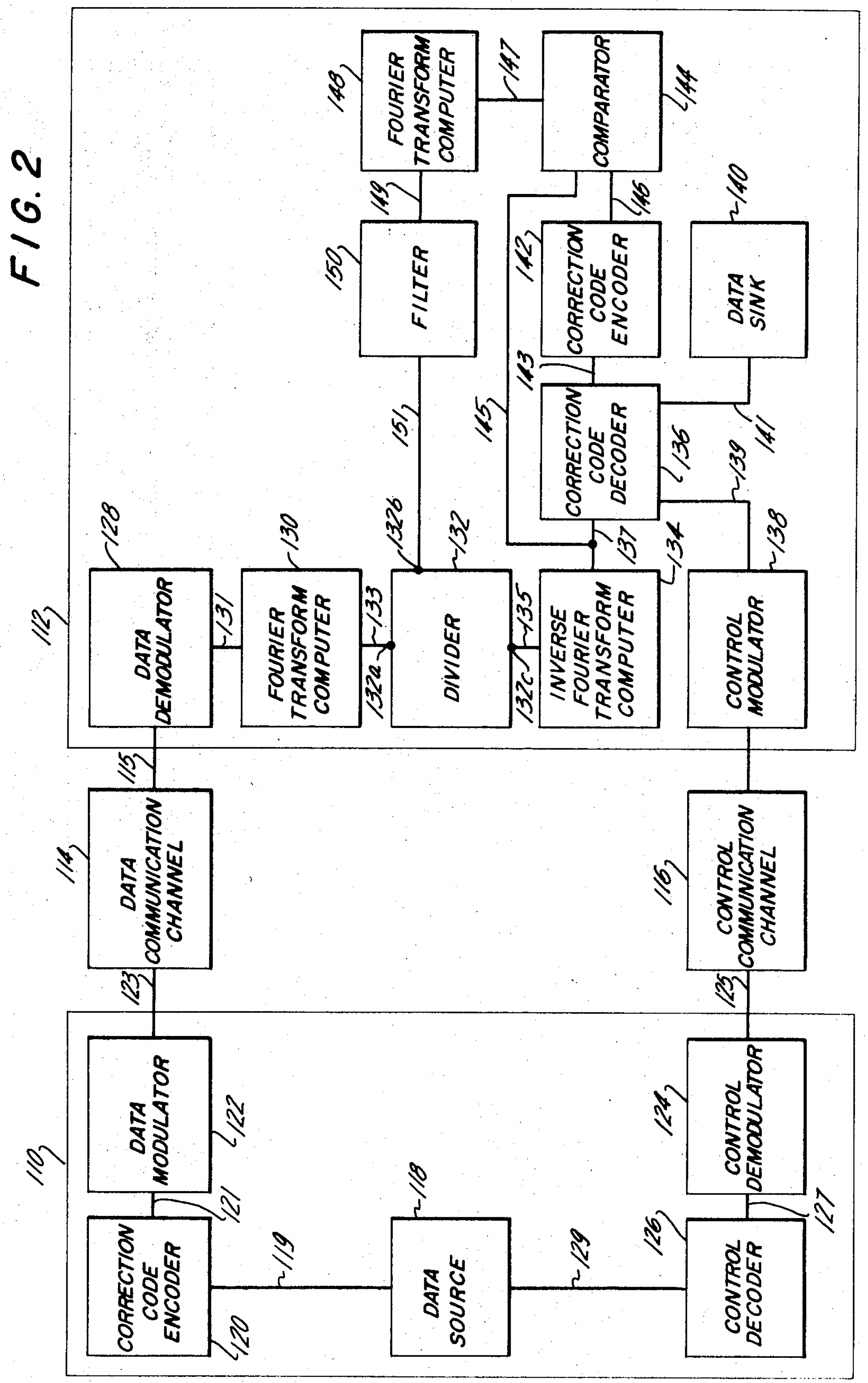
FIG. 2 is a block diagram of a data communication system employing an equalization system in accordance with the invention incorporating therein a preferred form of the equalizer of the invention.

Referring to FIG. 2, the digital information transmission system illustrated therein comprises a transmitting station 110, a receiving station 112, a data communication channel 114, and a control communication channel 116. Channel 114 is primary and conveys utilizable data information and associated interspersed error correction information from station 110 to station 112. Channel 116 is secondary and conveys various control information from station 112 to station 110 such as, for example, the above-discussed repeat transmission requests. Channels 114 and 116 are typically telephone channels subject to spurious noise generally promoting such requests. The channels are further characterized by departures in the amplitude and phase frequency responses thereof from ideal responses, such departures being gradual and underlying the need for equalization and some repeat transmission requests. While the channels are illustrated as being separate, a single channel may be employed with appropriate multiplexing.

Transmitting station 110 includes a data source 118 which generates digital data signals for transmission to remote utilization apparatus. These data signals are applied over line 119 to an error correction code encoder 120 in which are stored signals informative of the error correction code employed throughout the system. The encoder, a suitably programmed computer, operates in the previously described manner to compute the $y$ error correction bits required for indicating the data content of transmitted data blocks and inserts same therein. The error correction encoded data signals are applied by encoder 120 over line 121 to data modulator 122 which conditions same for transmission over channel 114 applying same thereto over line 123. The transmitting station may further include a control demodulator 124 adapted to receive on line 125 control signals transmitted over channel 116 and to regenerate same in appropriate form for decoding by control decoder 126. Decoder 126 receives the control information over line 127 and applies its output over line 129 to data source 118 to control its data generation.

Turning to the receiving station 112, wherein the equalization system and equalizer of the invention are employed, channel 114 communicates over line 115 with a demodulator 128. The received versions of transmitted signals are regenerated by the demodulator in digital form and applied to a first fourier transform computer 130 over line 131. This unit is preferably a digital computer appropriately programmed in a known manner to transform the time domain digital signals provided by demodulator 128 into the frequency domain. Computer 130 provides at its output terminals signals representative of the frequency spectra of the digital data signals applied thereto. In this connection it is to be noted that the phase of a frequency spectrum signal denotes a particular one of the class of data blocks represented thereby. These frequency spectra signals are applied over line 133 to divider 132 which constitutes an electrical circuit adapted to divide the signals applied to its terminal **132*a* by the signals applied to its terminal 132*b* and to generate a signal representative of the quotient of the applied signals at its output terminal 132*c*. Both of the applied signals are frequency spectra signals and the divider output signals are thus also frequency spectra signals. The divider output signals are conducted over line 135 to inverse fourier transform computer 134 which is adapted to transform the quotient signal from the frequency domain into the time domain. In other words, there are produced at the output of computer 134** time varying digital signals contained in the frequency spectra signals applied to the computer input.

The data signals generated by computer 134 constitute the above-mentioned preliminarily equalized signals, now in the frequency domain. As will be shown in more detail hereinafter there is effected in divider 132 a modification of received signals by an equalization control signal applied to terminal **132*b* of the divider. Since such equalization control signal was generated prior to the receipt of the received signals affected thereby, the term preliminarily equalized is again employed. The provision at terminal 132*b* of the divider 132** of equalization control signals is accomplished by circuitry to be considered presently.

The preliminarily equalized digital signals provided in the time domain by computer 134 are applied to error correction code decoder 136 over line 137. This device has stored therein signals indicative of the error correction code employed in encoder 120 of the transmitting station 110. The decoder operates upon applied digital signals extracting therefrom the $y$ (error correction) bits and thus segregating transmitting data. Upon analysis of the data and the error correction bits, the decoder performs the necessary corrections to the data. If the requisite correction exceeds the correction capacity of decoder 136, a repeat transmission request is applied over line 139 to control modulator 138 for transmission to data transmitting station 110. Where the requisite correction is within the capacity of the decoder, corrected data is applied from the decoder over line 141 to data sink 140 which may be any data utilization device or storage means.

The corrected data signals are also directed to an error correction encoder 142 over line 143. Encoder 142 is a direct counterpart of encoder 120 of transmitting station 110 identical thereto in all respects, and operative to apply the system error correction code to the applied corrected data signals. The encoder output signals are thus a reconstituted version of the signals applied to channel 114 over transmitting station line 123. These signals constitute a standard apt for determination of the quality of channel 114 when compared with the received version of the signals actually transmitted. It is to be noted further that these reconstituted signals are a derivative of the received signals and not an independently generated standard.

The proposed comparison is effected in a comparator 144 to which are applied over lines 145 and 146 respectively the preliminarily equalized uncorrected received signals and the reconstituted signals. The comparator provides output signals indicative of the difference between the applied signals all such output signals being in the time domain and coupled over line 147 to a second fourier transform computer 148.

At this juncture, the system reverse to the frequency domain, computer 148 providing at its output terminal signals indicative of the frequency spectra of its input signal. Such signals are conducted over line 149 to a filter 150 effective to cancel noise over a long time period and thus pass on to output line 151 a signal indicative solely of the effects of communication channel distortion attributable to said phase and frequency response irregularities. This signal, the equalizer control signal in the frequency domain, is applied to terminal 132*b* of divider 132.

The equalization scheme underlying the system of FIG. 2 represents a unique utilization of linear time invariant circuit analysis to implement equalization of a communication channel. In particular, the scheme employs the principle that, for any circuit, the product of the transform of the circuit itself and the transform of the circuit input signal is equal to the transform of the circuit output signal. Thus, we may provide in the receiver a true version of the communication channel input signal dividing the transform of the channel output signal by the transform of the channel itself. Computer 130 provides the transform of the output signal. Comparator 144 and computer 148 provide the transform of the channel. With this information divider 132 provides the transform of channel input signal Through inverse transform computer 134, the receiver is provided with the channel input signals in unmodulated character.

The linear time invariant equalizer of FIG. 2 is of course provided with information for computation of the channel transform by comparator 144 and computer 148 in accordance with the equalization system of FIG. 1. To this extent decoder 136 and encoder 142 cooperate to provide to comparator 144 on line 146 signals representative of the signals actually applied to the channel by encoder 120 of this transmitting station 110. Received signals with preliminary equalization are provided to comparator 144 on line 145. As above discussed differential comparison of these comparator input signals provides output signals indicative of the instantaneous transmission characteristics of the channel. These signals are translated into the frequency domain by computer 148.

In order to avoid the introduction of unnecessary and voluminous detail in this specification as to particular circuit elements employable herein and further details of operation of such circuits, reference shall be made to several publications wherein these details are set forth with extended discussion. For example, transversal filter equalization apparatus, the structural details thereof and the operating character thereof in response to applied equalization control signals are set forth in *Bell System Technical Journal*, Feb. 19, 1966, pages 255—286. As will be observed in this reference, the transversal filter operates in the time domain and is a variably settable multiple tap filter whose taps are set in accordance with equalization control signals to modify the phase and/or amplitude characteristics of applied signals. A further publication reference providing equalizer description is *IEEE Spectrum*, Jan. 1967, pages 53—59. Digital computer application to fourier transform computation as a general computational procedure is equally well known in the art and is discussed in detail in *IEEE Transaction on Audio and Electro Acoustics*, June, 1967, pages 79—84 and 91—98. In the present invention no claim of novelty is made as to such computers per se nor their general use under known programming in the computation of the fourier transform of time varying information. Rather the present invention is directed to a novel equalization system and a unique linear time invariant equalizer.

While the invention has been disclosed by way of particularly preferred embodiments for the equalization system and for the linear time invariant equalizer, it will be evident that various design changes and modifications may be introduced therein by those with ordinary skill in the data communication arts. These embodiments are thus intended in a descriptive and not in a limiting sense. The full scope of the invention will be evident from the following claims.

What I claim is:

1. A system for compensating error correction encoded digital signals for distortion induced therein by the communication channel over which the signals are transmitted comprising in combination:

a. an equalizer circuit including means receiving said transmitted digital signals and modifying the characteristics thereof in accordance with system generated equalizer control signals;

b. a decoder having stored therein the error correction code employed in error correction encoding said transmitted digital signals and including means receiving said modified digital signals, detecting error code bits and data bits therein, correcting said data bits in accordance with said error correction code, and generating corrected data signals;

c. an encoder having stored therein said error correction code and including means receiving said corrected data signals, and error correction encoding same; and d. a comparator including means receiving said modified digital signals from said equalizer and said error correction encoded corrected data signals from said encoder, detecting differences therebetween and generating signals indicative of said differences, said difference signals constituting said equalizer control signals.

2. The system claimed in claim 1 wherein said equalizer comprises:

a–1. a first transform circuit having means receiving said transmitted digital signals and generating output signals representative of the frequency spectra thereof;

a–2. a second transform circuit having means receiving said comparator produced equalizer control signals and generating output signals representative of the frequency spectra thereof;

a–3. means filtering said second transform circuit output signals;

a–4. a divider circuit having means receiving said first and said filtered second transform circuit output signals and dividing the former by the latter to generate quotient signals; and a–5. an inverse transform circuit having means receiving said quotient signals and converting same to time domain signals, said last-mentioned signals constituting said modified digital signals.

3. A system for transmission of digital signals from a transmitting station to a receiving station over a communication channel comprising, in combination:

at the transmitting station a. a source generating digital data signals;

b. an encoder having stored therein a system error correction code and including means receiving said digital data signals and error correction encoding same;

c. a modulator including means receiving said error correction encoded digital signals and conditioning same for transmission on said channel; and at the receiving station d. a demodulator including means receiving said transmitted signals from said channel and converting same to digital signals;

e. an equalizer circuit including means receiving said digital signals from said demodulator and modifying the characteristics thereof in accordance with receiver-generated equalizer control signals;

f. a decoder having stored therein said error correction code and including means receiving said modified digital signals, detecting error code bits and data bits therein, correcting said data bits in accordance with said error correction code, and generating corrected data signals;

g. a data utilization device receiving said corrected data signals;

h. an encoder having stored therein said error correction code and including means receiving said corrected data signals and error correction encoding same; and i. a comparator including means receiving said modified digital signals from said equalizer and said error correction encoded corrected data signals from said receiver encoder, detecting differences therebetween and generating signals indicative of said differences, said difference signals constituting said receiver-generated equalizer control signals.

4. A linear time invariant communication channel equalizer for use in an equalization system receiving time varying transmitted signals operated upon by said channel and time varying signals indicative of departures in communication channel phase and amplitude frequency characteristics from ideal responses thereof, comprising, in combination:

a. a first transform circuit having means receiving said signals operated upon by said channel and generating output signals representative of the frequency spectra thereof;

b. a second transform circuit having means receiving said channel characteristic signals and generating output signals representative of the frequency spectra thereof;

c. means filtering said second transform circuit output signals;

d. a divider circuit having means receiving said first and said filtered second transform circuit output signals and dividing the former by the latter to generate quotient signals; and e. an inverse transform circuit having means receiving said quotient signals and converting same to time varying output signals, said output signals being representative of said transmitted signals prior to operation thereon by said channel.